US012518505B2

(12) United States Patent
Hagiwara et al.

(10) Patent No.: US 12,518,505 B2
(45) Date of Patent: Jan. 6, 2026

(54) IMAGE PROCESSING DEVICE AND IMAGE PROCESSING METHOD

(71) Applicant: Socionext Inc., Kanagawa (JP)

(72) Inventors: Soichi Hagiwara, Yokohama (JP); Yuji Umezu, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 284 days.

(21) Appl. No.: 18/478,623

(22) Filed: Sep. 29, 2023

(65) Prior Publication Data

US 2024/0037900 A1  Feb. 1, 2024

Related U.S. Application Data

(63) Continuation of application No. PCT/JP2021/014932, filed on Apr. 8, 2021.

(51) Int. Cl.
*G06T 7/90* (2017.01)
*G06T 7/13* (2017.01)
*G06V 10/56* (2022.01)
*H04N 23/10* (2023.01)

(52) U.S. Cl.
CPC ............... *G06V 10/56* (2022.01); *G06T 7/13* (2017.01); *G06T 7/90* (2017.01); *H04N 23/10* (2023.01); *G06T 2207/10024* (2013.01)

(58) Field of Classification Search
CPC ......... G06V 10/56; G06V 20/56; G06T 7/13; G06T 7/90; G06T 2207/10024; G06T 5/90; G06T 1/00; H04N 23/10; H04N 7/18; H04N 23/60; H04N 23/07
USPC ...................................................... 382/167
See application file for complete search history.

(56) References Cited

U.S. PATENT DOCUMENTS

| | | | | |
|---|---|---|---|---|
| 2012/0018646 A1* | 1/2012 | Takahashi | .............. | H04N 23/30 250/371 |
| 2014/0184894 A1* | 7/2014 | Motta | .................. | H04N 23/741 348/362 |
| 2015/0256760 A1* | 9/2015 | Ju | .......................... | H04N 23/76 348/256 |

(Continued)

FOREIGN PATENT DOCUMENTS

| | | |
|---|---|---|
| EP | 3288255 A1 | 2/2018 |
| JP | 2005-284423 A | 10/2005 |

(Continued)

OTHER PUBLICATIONS

International Search Report (ISR) dated Jun. 22, 2021 issued in International Patent Application No. PCT/JP2021/014932, with English translation.

(Continued)

*Primary Examiner* — Ali Bayat
(74) *Attorney, Agent, or Firm* — Rimon P.C.

(57) ABSTRACT

An image processing device includes an extracting part and a prediction part. The extracting part extracts an unsaturated area, in which pixel values are not saturated, and a saturated area, in which pixel values are saturated, from image data that is captured by an imaging device and that shows an image including a plurality of pixels. The prediction part predicts a pixel value of a pixel of interest in the saturated area based on pixel values of a plurality of border pixels in a border area, the border area being located in the unsaturated area and bordering the saturated area.

10 Claims, 15 Drawing Sheets

(56) References Cited

U.S. PATENT DOCUMENTS

| | | | | |
|---|---|---|---|---|
| 2016/0073076 A1* | 3/2016 | Carroll | ................... | H04N 23/88 |
| | | | | 348/242 |
| 2018/0374240 A1* | 12/2018 | Zhang | ....................... | G06T 7/90 |
| 2020/0162695 A1* | 5/2020 | Danielyan | ............ | H04N 25/583 |
| 2020/0311981 A1 | 10/2020 | Hiasa | | |
| 2021/0042881 A1* | 2/2021 | Zavalishin | ............ | G06T 3/4015 |

FOREIGN PATENT DOCUMENTS

| | | |
|---|---|---|
| JP | 2012-134586 A | 7/2012 |
| JP | 2013-093786 A | 5/2013 |
| JP | 2017-112421 A | 6/2017 |
| JP | 2018-032952 A | 3/2018 |
| JP | 2018-125585 A | 8/2018 |
| JP | 2020-162034 A | 10/2020 |
| JP | 2020-166628 A | 10/2020 |

OTHER PUBLICATIONS

Written Opinion of the International Searching Authority dated Jun. 22, 2021 issued in International Patent Application No. PCT/JP2021/014932, with English translation.

* cited by examiner

FIG.8

---- : PREDICTION BASED ON COMPONENT OF DIFFERENT COLOR
—·— : PREDICTION BASED ON UNSATURATED BASE COLOR

| SECTION | APPROXIMATE EXPRESSION |
|---|---|
| SECOND SECTION | $\hat{G} = \alpha(a_R R + a_B B + a_C) + (1-\alpha) F(x,y,G)$ ··(2) |
| THIRD SECTION | $\hat{R} = \alpha(a_B B + a_C) + (1-\alpha) F(x,y,R)$ ··(3-1)<br>$\hat{G} = \alpha(a_R \hat{R} + a_B B + a_C) + (1-\alpha) F(x,y,G)$ ··(3-2) |
| FOURTH SECTION | $\hat{B} = F(x,y,B)$ ··(4-1)<br>$\hat{R} = \alpha(a_B \hat{B} + a_C) + (1-\alpha) F(x,y,R)$ ··(4-2)<br>$\hat{G} = \alpha(a_R \hat{R} + a_B \hat{B} + a_C) + (1-\alpha) F(x,y,G)$ ··(4-3) |
| PREDICTION BASED ON COMPONENT OF DIFFERENT COLOR | $a_R = \beta \cdot PREDICTED\ GR\ RATIO$ ··(5-1)<br>$a_B = (1-\beta) \cdot PREDICTED\ GB\ RATIO$ ··(5-2)<br>$a_C = 0$ ··(5-3) |
| PREDICTION BASED ON UNSATURATED BASE COLOR | $\frac{dG}{dx}(x,y) = G(t_x, y) - G(t_x - 1, y)$ ··(6-1)<br>$F(x,y,G) = G(t_x, y) + (x - t_x) \frac{dG}{dx}(t_x, y)$ ··(6-2)<br>$F(x,y,G) = G(t_x, y) + (x - t_x) \frac{dG}{dx} + (x - t_x)^2 \frac{d^2 G}{dx^2}$ ··(6-3) |

FIG.14

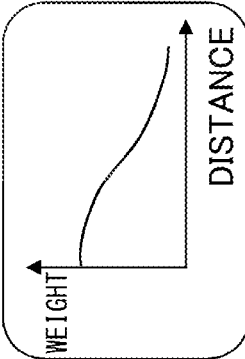

$$\begin{cases} \text{FIRST TERM OF } \hat{G} = a_R R + a_B B + a_c & \cdots(2) \\ a_R = \beta \cdot \text{PREDICTED GR RATIO} & \cdots(5-1) \\ a_B = (1-\beta) \cdot \text{PREDICTED GB RATIO} & \cdots(5-2) \\ a_c = 0 & \cdots(5-3) \end{cases}$$

$$V(t_x, t_y) = \begin{cases} \text{WHEN } 0 \ldots G(t_x, t_y) \text{ ARE SATURATED PIXELS} \\ \text{WHEN } 1 \ldots G(t_x, t_y) \text{ ARE UNSATURATED PIXELS} \end{cases} \cdots(7-1)$$

$$\text{PREDICTED GR RATIO} = \sum_{t_x, t_y} \underbrace{\frac{k \cdot C + (G(t_x,t_y)/R(t_x,t_y)) \exp\left(-\frac{(x-t_x)^2 + (y-t_y)^2}{2\sigma^2}\right) V(t_x,t_y)}{\underbrace{k + \exp\left(-\frac{(x-t_x)^2 + (y-t_y)^2}{2\sigma^2}\right) V(t_x,t_y)}_{\text{TERM E}}}}_{} \cdots(7-2)$$

$$J = \sum_{t_x, t_y} \underbrace{V(t_x,t_y)(G-\hat{G})^2}_{\text{TERM A}} + \underbrace{k_R(a_R - WB_R)^2 + k_B(a_B - WB_B)^2}_{\text{TERM B}} \underbrace{\phantom{k_B(a_B - WB_B)^2}}_{\text{TERM C}} \cdots(7-3)$$

$$\hat{G} = a_R R + a_B B + a_c + b \cdot F(x,y,G) \quad \cdots(7-4)$$

FIG.15

$$\left(\frac{dG}{dx}, \frac{dG}{dy}\right) = (G(x+1, y) - G(x, y), G(x, y+1) - G(x, y)) \quad \cdot\cdot(8\text{-}1)$$

$$W(t_x, t_y) = \begin{cases} \text{WHEN } 0 \ldots G(t_x, t_y) \text{ ARE SATURATED PIXELS} \\ \text{WHEN } 1 \ldots G(t_x, t_y) \text{ ARE UNSATURATED PIXELS} \end{cases} \quad \cdot\cdot(8\text{-}2)$$

$$F(x, y, G) = \sum_{t_x, t_y} \frac{\overbrace{k \cdot C}^{\text{TERM D}} + \overbrace{\left(G(t_x, t_y) + \left((x - t_x)\frac{dG}{dx} + (y - t_y)\frac{dG}{dy}\right)\right)}^{\text{TERM A}} \overbrace{\exp\left(-\frac{(x - t_x)^2 + (y - t_y)^2}{2\sigma^2}\right)}^{\text{TERM B}} \overbrace{W(t_x, t_y)}^{\text{TERM C}}}{k + \underbrace{\exp\left(-\frac{(x - t_x)^2 + (y - t_y)^2}{2\sigma^2}\right) W(t_x, t_y)}_{\text{TERM E}}} \quad \cdot\cdot(8\text{-}3)$$

IMAGE PROCESSING DEVICE AND IMAGE PROCESSING METHOD

CROSS-REFERENCE TO RELATED APPLICATION

The present application is a continuation application filed under 35 U.S.C. 111(a) claiming the benefit under 35 U.S.C. 120 and 365(c) of PCT International Application No. PCT/JP2021/014932, filed on Apr. 8, 2021, and designating the U.S. The entire contents of PCT International Application No. PCT/JP2021/014932 are incorporated herein by reference.

BACKGROUND OF THE INVENTION

1. Field of the Invention

The present invention relates to an image processing device and an image processing method.

2. Description of the Related Art

In recent years, various techniques have been proposed, whereby, for example, the recognition of images displayed on a display device is improved by performing image processing on image data that is captured by an imaging device installed in a mobile entity such as a vehicle. For example, by synthesizing multiple image data captured by multiple imaging devices, or by selecting one from multiple image data, an image with reduced blown-out highlights or crushed shadows can be displayed.

CITATION LIST

Patent Document

Patent Document 1: Unexamined Japanese Patent Application Publication No. 2020-162034
Patent Document 2: Unexamined Japanese Patent Application Publication No. 2020-166628
Patent Document 3: Unexamined Japanese Patent Application Publication No. 2018-032952
Patent Document 4: Unexamined Japanese Patent Application Publication No. 2017-112421
Patent Document 5: Unexamined Japanese Patent Application Publication No. 2018-125585
Patent Document 6: Unexamined Japanese Patent Application Publication No. 2012-134586
Patent Document 7: Unexamined Japanese Patent Application Publication No. 2013-093786

SUMMARY OF INVENTION

Technical Problem

For example, the image data in an area where there is a blown-out highlight has the upper limit pixel value that can be output from the imaging device. However, the actual brightness in the photographing area of the photographing object where there is a blown-out highlight is not uniform, but varies slightly. Consequently, a method for uniformly correcting the saturated area in which there are pixel values greater than the upper limit value cannot obtain the correct image of the photographing object. Also, if only one image data that is captured by one imaging device is available, it is then difficult to predict the photographing object's image in an area where a blown-out highlight has appeared.

The present invention has been made in view of the foregoing, and aims to predict the brightness value of the photographing object in an area where there is a blown-out highlight, by using the image data in which the blown-out highlight has appeared.

Solution to Problem

According to one aspect of the present invention, an image processing device includes: an extracting part configured to extract an unsaturated area, in which pixel values are not saturated, and a saturated area, in which pixel values are saturated, from image data that is captured by an imaging device and that shows an image including a plurality of pixels; and a prediction part configured to predict a pixel value of a pixel of interest in the saturated area based on pixel values of a plurality of border pixels in a border area, the border area being located in the unsaturated area and bordering the saturated area.

Advantageous Effects of Invention

According to the technique disclosed herein, it is possible to predict the brightness value of the photographing object's image in an area where there is a blown-out highlight, by using the image data where the blown-out highlight has appeared.

BRIEF DESCRIPTION OF DRAWINGS

FIG. 8 is a diagram for explaining examples of approximate expressions used in the image processing of FIG. 7;

FIG. 14 is a diagram for explaining examples of approximate expressions that are used when the pixel value prediction shown in FIG. 13 is performed by using the first prediction process; and FIG. 15 is a diagram for explaining examples of approximate expressions that are used when the pixel value prediction shown in FIG. 13 is performed by using the second prediction process.

DETAILED DESCRIPTION OF THE PREFERRED EMBODIMENTS

Embodiments will be described below with reference to the accompanying drawings. In the following description, image data may simply be referred to as an "image."

First Embodiment

Figure 1:
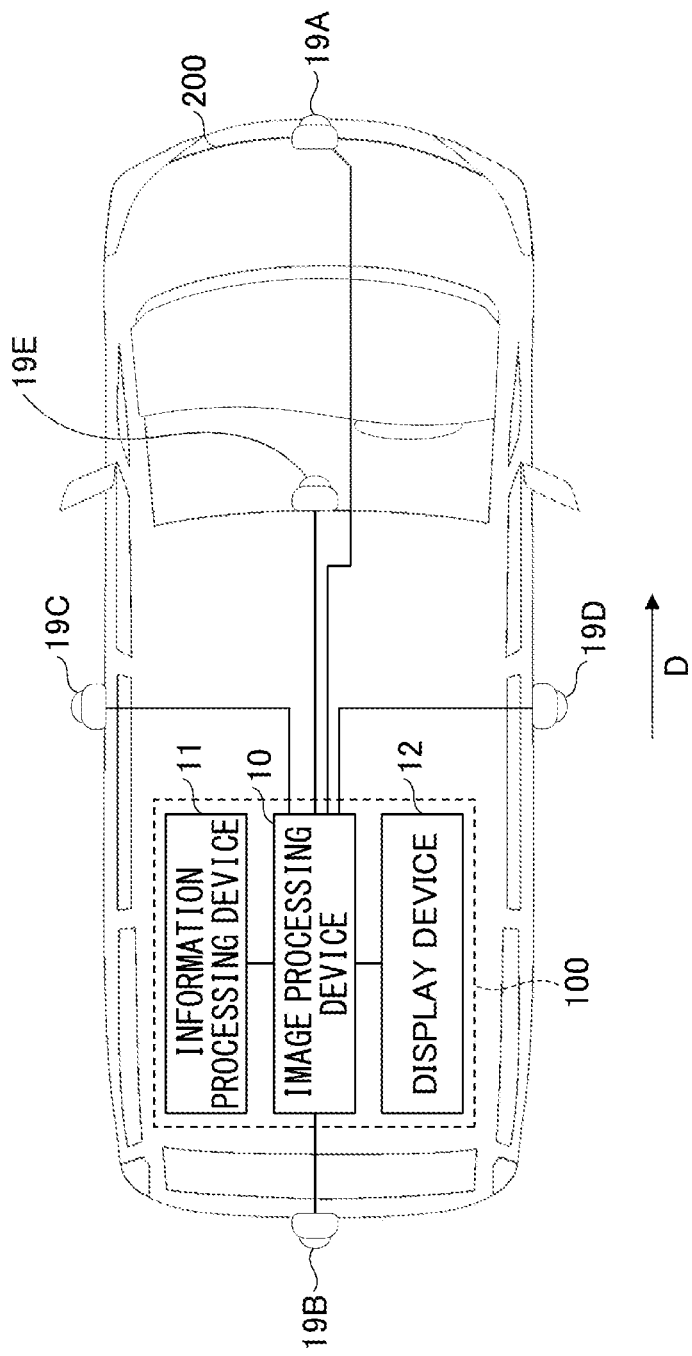
FIG. 1 is an image diagram that illustrates an example of an image processing system including an image processing device according to a first embodiment.

FIG. 1 shows an example of an image processing system including an image processing device according to a first embodiment. As shown in FIG. 1, an image processing system 100 is mounted, for example, in a mobile entity 200 such as an automobile. Imaging devices 19A, 19B, 19C, 19D, and 19E such as cameras are installed in front, rear, left, and right parts of the mobile entity 200 with respect to the traveling direction D, and in a front part in the interior of the mobile entity 200. Hereinafter, the imaging devices 19A, 19B, 19C, 19D, and 19E will be referred to as "imaging devices 19" when they are described without distinction.

Note that the number and installation positions of the imaging devices 19 in the mobile entity 200 are not limited to those shown in FIG. 1. For example, only one imaging device 19 may be installed in a front part of the mobile entity 200, or two imaging devices 19 may be installed in front and rear parts. Alternatively, an imaging device 19 may be installed on the ceiling of the mobile entity 200. Also, the mobile entity 200, on which the image processing system 100 is mounted, is by no means limited to an automobile, and may be, for example, a transport robot or a drone that operates in a factory. Also, the image processing system 100 may be, for example, a system that processes images captured by imaging devices other than the imaging devices installed in the mobile entity 200, such as surveillance cameras, digital still cameras, digital camcorders, and so forth.

The image processing system 100 has an image processing device 10, an information processing device 11, and a display device 12. Note that, in FIG. 1, for ease of explanation, the image processing system 100 is superimposed over the image diagram of the mobile entity 200 viewed from above. However, in reality, the image processing device 10 and the information processing device 11 are mounted on a control board or the like provided in the mobile entity 200, and the display device 12 is positioned such that people in the mobile entity 200 can see it. Note that the image processing device 10 may be mounted on a control board or the like as part of the information processing device 11. The image processing device 10 is connected to each imaging device 19 with a signal cable or wirelessly.

Figure 2:
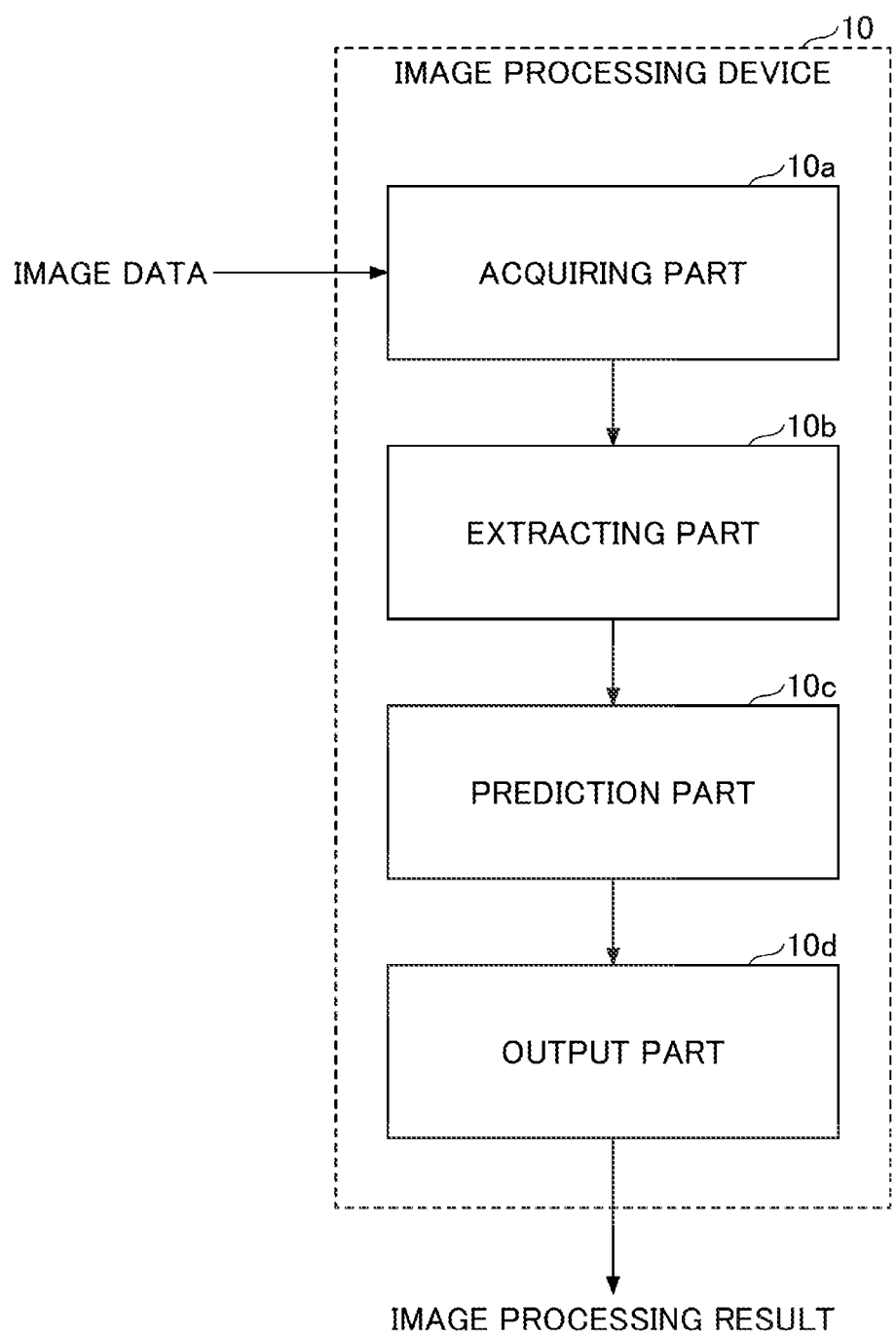
FIG. 2 is a block diagram that illustrates an example functional structure of the image processing device of FIG. 1.

FIG. 2 shows an example functional structure of the image processing device 10 of FIG. 1. The image processing device 10 has an acquiring part 10a, an extracting part 10b, a prediction part and an output part 10d. The acquiring part 10a captures image data showing images around the mobile entity 200, photographed by an individual imaging device 19. The extracting part 10b and the prediction part 10c perform image processing (correction process) on the image data captured by each imaging device 19. The output part 10d outputs the results of image processing to at least one of the display device 12 and the information processing device 11.

Referring back to FIG. 1, the display device 12 is, for example, a display of a side mirror monitor, a rearview mirror monitor, or a navigation device installed in the mobile entity 200. Note that the display device 12 may be a display provided in the dashboard or the like, or a head-up display or the like that projects images onto a projection panel, the windshield, or the like.

The information processing device 11 includes a computer such as a processor that performs a recognition process or the like based on the image data received via the image processing device 10. For example, the information processing device 11 installed in the mobile entity 200 may detect other mobile entities, traffic lights, signs, white lines on the road, people, and so forth by performing the recognition process of image data, and determine the situation surrounding the mobile entity 200. Note that the information processing device 11 may include an automatic drive control device that controls the mobile entity 200 to move, stop, turn right, turn left, and so forth.

Figure 3:
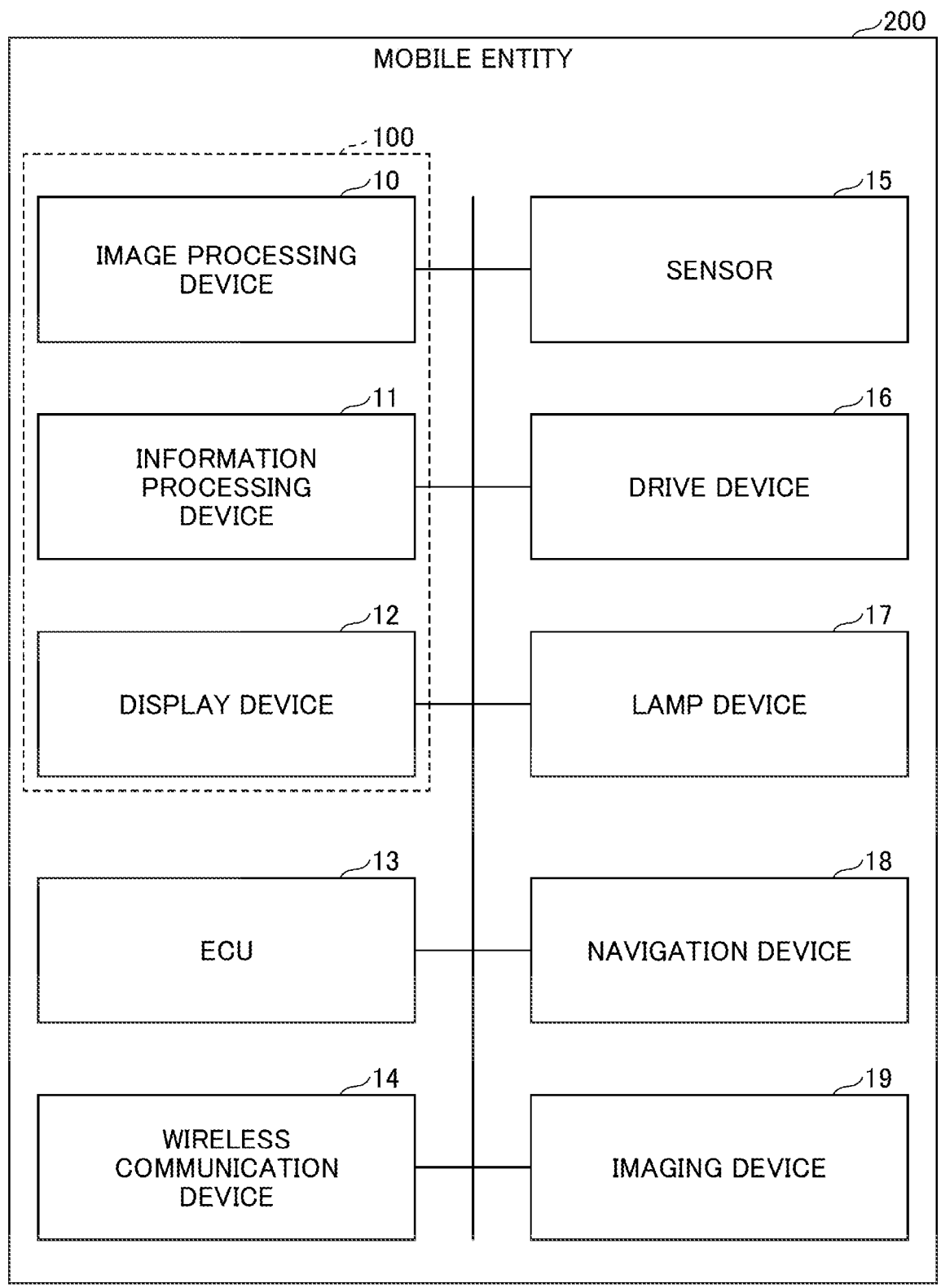
FIG. 3 is a block diagram that illustrates an overview of a structure of various devices mounted on the mobile entity of FIG. 1.

FIG. 3 shows an overview of a structure of various devices mounted in the mobile entity 200 of FIG. 1. The mobile entity 200 has an image processing device 10, an information processing device 11, a display device 12, at least one ECU (Electronic Control Unit) 13, and a wireless communication device 14, which are interconnected via an internal network. Also, the mobile entity 200 has a sensor 15, a driving device 16, a lamp device 17, a navigation device 18, and an imaging device 19. For example, the internal network is an in-vehicle network such as CAN (Controller Area Network) or Ethernet (registered trademark).

The image processing device 10 corrects the image data (frame data) captured by the imaging device 19, and generates corrected image data. The image processing device 10 may record the corrected image data that is generated, in an external or internal recording device.

The information processing device 11 may function as a computer that controls each part of the mobile entity 200. The information processing device 11 controls the entire mobile entity 200 by controlling the ECUs 13. The information processing device 11 may recognize an object outside the mobile entity 200 based on an images generated by the image processing device 10, and track the recognized object.

The display device 12 displays the image, the corrected image, and so forth generated by the image processing device 10. When the mobile entity 200 moves backward, the display device 12 may display an image of the back of the mobile entity 200 on a real-time basis. Furthermore, the display device 12 may display images output from the navigation device 18.

The ECUs 13 are provided so as to correspond to mechanical parts such as the engine, transmission, and so forth. Each ECU 13 controls the corresponding mechanical part based on commands from the information processing device 11. The wireless communication device 14 communicates with devices outside the mobile entity 200. The sensor 15 is a sensor for detecting various types of information. The sensors 15 may include, for example, a location sensor that acquires current location information of the mobile entity 200. Also, the sensor 15 may include a speed sensor that detects the speed of the mobile entity 200.

The drive device 16 includes various devices for moving the mobile entity 200. The drive device 16 may include, for example, an engine, a steering device (steering wheel), and a braking device (brake). The lamp device 17 refers to various lamps mounted on the mobile entity 200. The lamp device 17 may include, for example, headlights (headlamps, headlights), turn signal lamps (winkers), backlights, brake lamps, and so forth. The navigation device 18 is a device that guides the route to the destination by voice and display.

Figure 4:
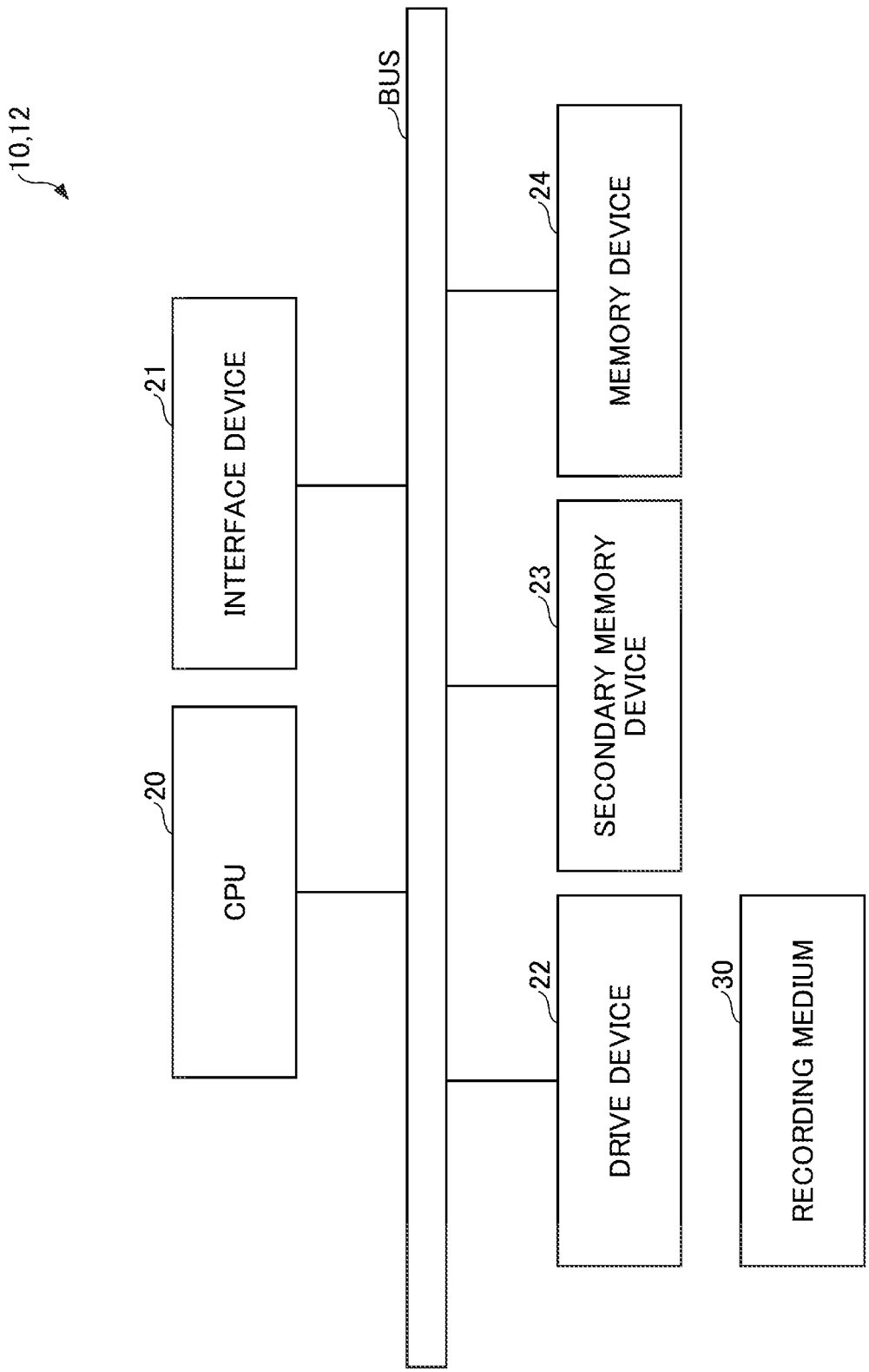
FIG. 4 is a block diagram that illustrates an example structure of the image processing device and the image processing device of FIG. 3.

FIG. 4 shows example structures of the image processing device 10 and the information processing device 11 of FIG. 3. Since the image processing device 10 and information processing device 11 have similar structures, the structure of the image processing device 10 will be described below. For example, the image processing device 10 has a CPU an interface device 21, a drive device 22, a secondary memory device 23, and a memory device 24, which are interconnected by a bus.

By executing an image processing program stored in the memory device 24, the CPU 20 executes various image processing, which will be described later. The interface device 21 is used to connect to a network (not shown). The secondary memory device 23 is, for example, a HDD (Hard Disk Drive) or an SSD (Solid State Drive), and holds an image processing program, image data, various parameters to be used in image processing, and so forth.

The memory device 24 is, for example, a DRAM (Dynamic Random Access Memory) or the like, and holds an image processing program or the like that is transferred from the secondary memory device 23. The drive device 22 has an interface that connects the recording medium 30, and, for example, transfers the image processing program stored in the recording medium 30 to the secondary memory device 23 based on a command from the CPU 20. Note that the drive device 22 may transfer the image data and the like, stored in the secondary memory device 23, to the recording medium 30.

Figure 5:
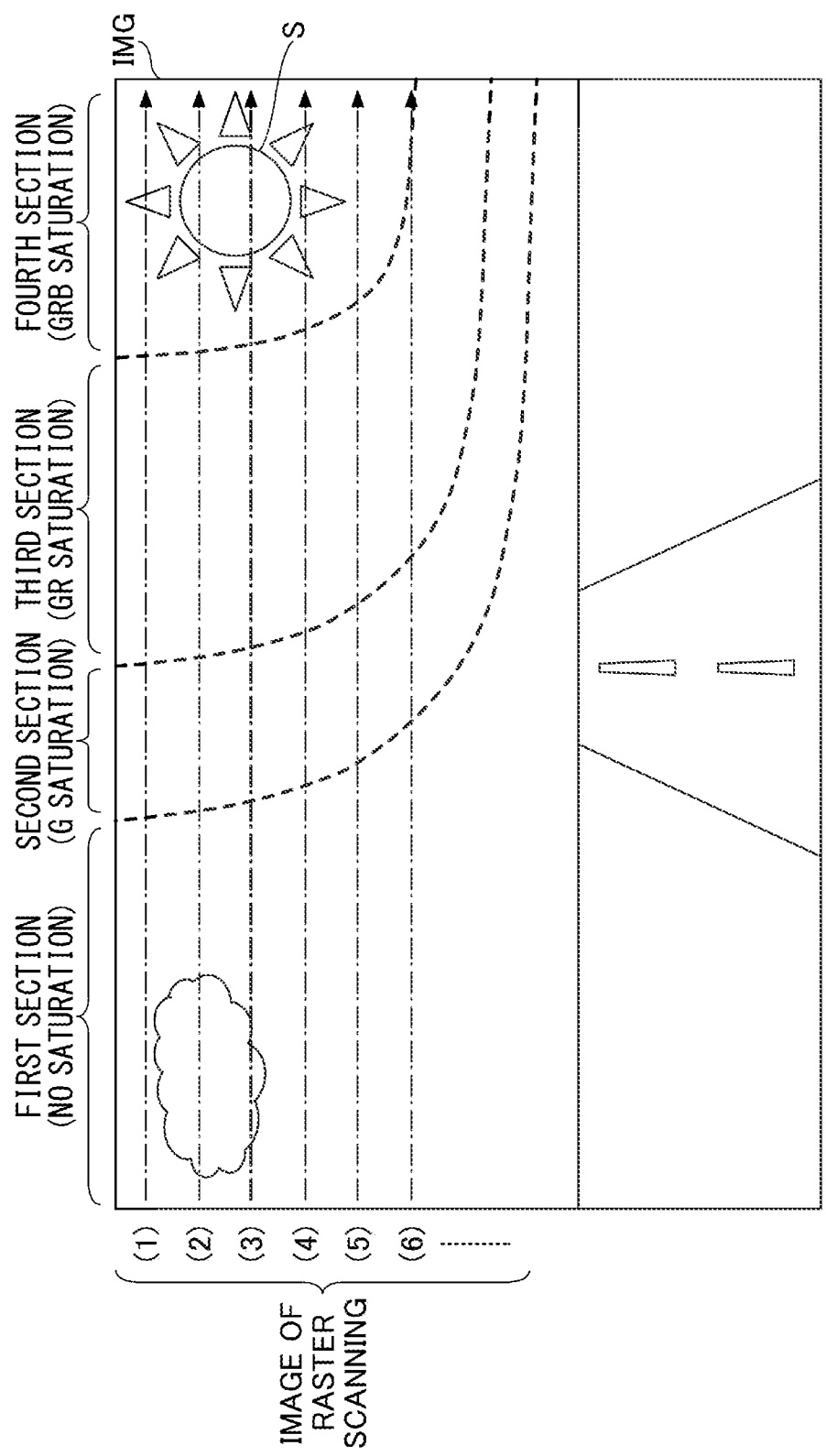
FIG. 5 is a diagram for explaining an example of image processing of an image captured by the imaging device of FIG. 1.

FIG. 5 shows an example of image processing of an image IMG captured by an imaging device 19 in FIG. 1. For example, the imaging device 19 may be an image sensor, in which pixels formed with three photoelectric conversion elements for detecting red R, green G, and blue B lights are arranged as a matrix. In the following description, each of the three photoelectric conversion elements will be also referred to as a "pixel." The pixel values of the red R, green G, and blue B pixels are also referred to as the "R value," "B value," and "G value," respectively.

Note that the photoelectric conversion elements to be included in the pixels of the imaging device 19 are by no means limited to red R, green G, and blue B. For example, the pixels of the imaging device 19 may include photoelectric conversion elements for detecting near-infrared light. Alternatively, the pixels of the imaging device 19 may include cyan, yellow, and magenta photoelectric conversion elements, or include cyan, yellow, and red photoelectric conversion elements.

The dashed-dotted line arrows in the image show how the imaging device 19 captures image data of the photographing object by raster scanning. Note that the image IMG may be captured by one of the imaging devices 19A to 19D, or may be a composite image that is obtained by synthesizing images captured by multiple imaging devices 19.

The image IMG of FIG. 5 includes, for example, the sun S as a photographing object image with high brightness. Therefore, pixels near the sun S have high brightness. The image IMG of FIG. 5 is divided into four sections by the curves indicated by dashed lines as borders.

In the first section, which is the furthest section from the sun S, the R, G, and B values are less than or equal to the maximum pixel value (upper limit value) that the imaging device 19 can capture (no saturation). That is, the first section is an unsaturated area in which none of the R value, G value, and B value is saturated.

In the second section, which is the next furthest section from the sun S, the R value and B value are less than or equal to the upper limit value, and the G value is greater than the upper limit value (G saturation). That is, the second section is an unsaturated area for the R value and B value that are not saturated, and is a saturated area for the G value that is saturated.

In the third section, which is closer to the sun S than the second section, the B value is less than or equal to the upper limit value, and the G value and R value are greater than the upper limit value (GR saturation). That is, the third section is an unsaturated area for the B value that is not saturated, and is a saturated area for the G value and R value that are both saturated.

In the fourth section, which is the closest section to the sun S, the G, R, and B values are greater than the upper limit value (GRB saturation). That is, the fourth section is a completely saturated area in which all of the G value, R value, and B value are saturated. When pixel values are saturated thus, the image captured by the imaging device 19 cannot represent the colors of the photographing object correctly. An image in which all of the G value, R value, and B value are saturated becomes white, producing an image with what is known as a "blown-out highlight."

The image processing device 10 performs a pixel value extraction process by using image data captured by the imaging device 19 per pixel of multiple colors, and extracts the unsaturated area and the saturated area for each of the R value, G value, and B value. The image processing device 10 performs at least one of a first prediction process, in which a pixel value is detected by using the ratio of an unsaturated component of a base color and a component of a different color, and a second prediction process, in which a pixel value is detected by using an unsaturated component of a base color.

In the first prediction process, the image processing device 10 predicts the G value in the second section from the R value in the second section, based on the ratio of the G value and R value in the first section where the G value and R value are not saturated. Also, the image processing device 10 predicts the G value in the second section from the B value in the third section, based on the ratio of the G value and B value in the first section where the G value and B value are not saturated.

The image processing device 10 predicts the R value in the fourth section from the B value in the fourth section, which is predicted in advance, based on, for example, the ratio of the B value in the fourth section that is predicted in advance and the R value and B value in a section where the R value and B value are not saturated. Also, the image processing device 10 predicts the G value in the fourth section from a predicted value of the B value in the fourth section based on, for example, the ratio of the G value and B value in the first section where the G value and B value are not saturated.

In the second prediction process, the image processing device 10 predicts the pixel value of the G value in the saturated area (the second section to the fourth section) based on, for example, the pixel values of multiple border pixels of the color G, located in the border area with the second section (saturated area) in the first section where the G value is not saturated. Also, the image processing device 10 predicts the pixel value of the R value in the saturated area (the third section and the fourth section) based on, for example, the pixel values of multiple border pixels of the color R, located in the border area with the third section (saturated area) in the second section where the R value is not saturated.

Furthermore, the image processing device 10 predicts the pixel value of the B value in the saturated area (fourth section) based on, for example, the pixel values of multiple border pixels of the color B, located in the border area with the fourth section (saturated area) in the third section where the B value is not saturated. Specific examples of the first and second prediction processes will be explained with FIG. 8 to FIG. 10.

The image processing device 10 performs at least one of the first prediction process and the second prediction process, so that, even when saturated pixel values are received from the imaging device 19, it is still possible to calculate, as predicted values, pixel values that correspond to the actual brightness values of the photographing object. By this means, the image processing device 10 can correct image data including pixel values of an area where there is a blown-out highlight, to image data without a blown-out highlight.

Figure 6:
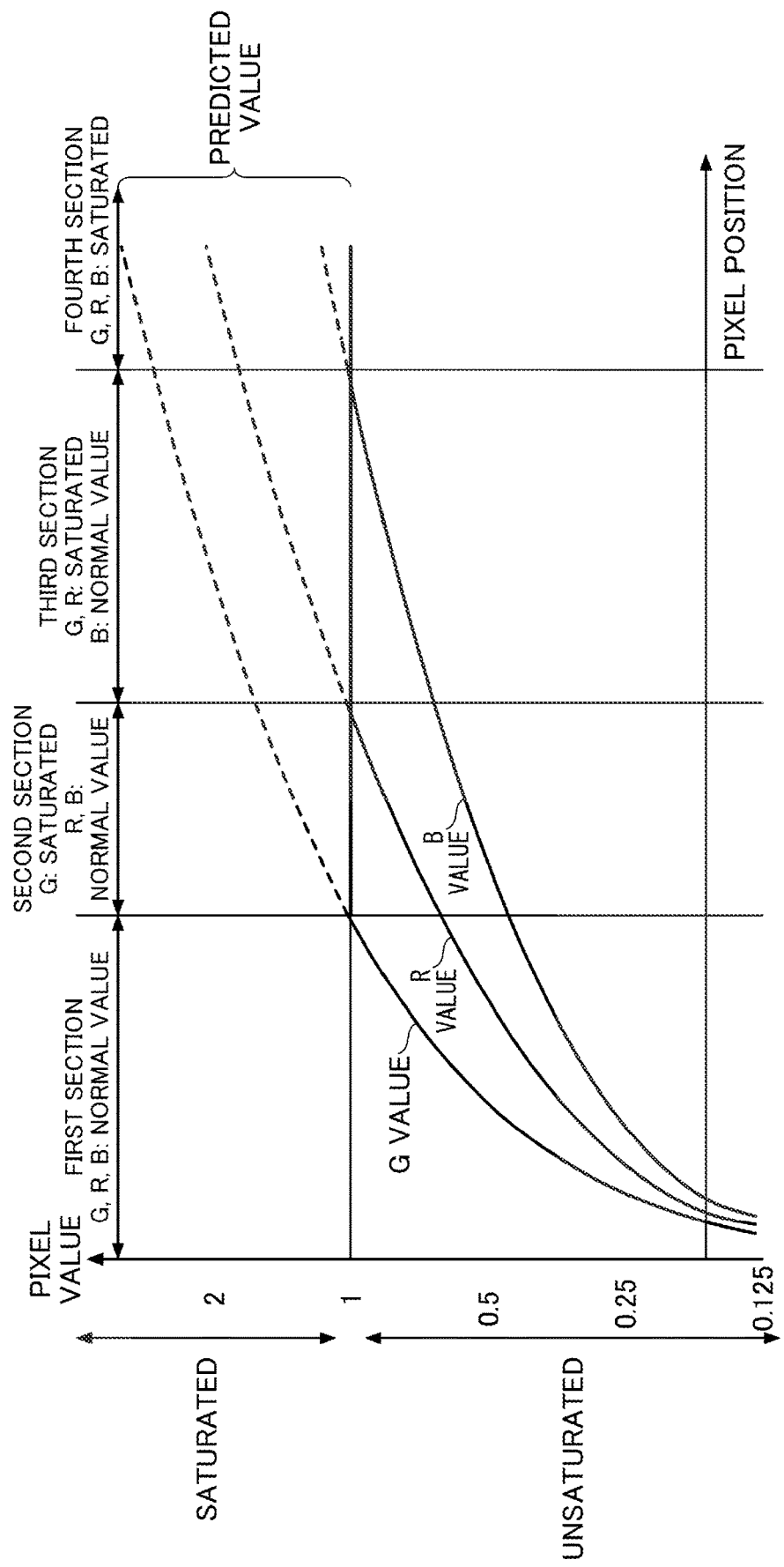
FIG. 6 is a diagram for explaining, in image data of a photographing object captured by the imaging device of FIG. 3, examples of pixel values that the imaging device can output and pixel values that the imaging device cannot output.

Note that FIG. 5, FIG. 6, and subsequent drawings will describe examples in which the pixel values saturate in the order of the G value, R value, and B value. This is because, in an RGB image sensor, sensitivity is generally higher in the order of G components, R components, and B components. However, the order of colors whose pixel values saturate is not limited to the example shown in FIG. 5.

In the image data of the photographing object captured by the imaging device 19 of FIG. 3, FIG. 6 shows pixel values that the imaging device 19 can output and pixel values that the imaging device 19 cannot output. The first section to the fourth section shown in FIG. 6 correspond to the first section to the fourth section in FIG. 5, respectively. For example, FIG. 6 shows the G value, R value, and B value on raster scan (5) in FIG. 5. The horizontal axis in FIG. 6 indicates the positions of pixels (horizontal coordinate) on raster scan (5).

The vertical axis in FIG. 6 is the pixel value ratio, on a logarithmic axis, where the maximum pixel value that the imaging device 19 can capture is "1." For example, when the imaging device 19 outputs 8-bit pixel values, "1" on the vertical axis corresponds to the pixel value "255." When the brightness of the photographing object is greater than the maximum pixel value ("1" on the vertical axis), the imaging device 19 outputs the maximum pixel value ("1" on the vertical axis). In the following description, the maximum pixel value will be also referred to as the "upper limit value."

In FIG. 6, the G value, R value, and B value, indicated by solid lines, are pixel values as output from the imaging device 19. The G value, R value, and B value, indicated by dashed lines, are pixel values that correspond to the actual brightness of the photographing object. The image processing device 10 predicts pixel values greater than the upper limit values indicated by the dashed lines by performing at least one of the first prediction process and the second prediction process.

Figure 7:
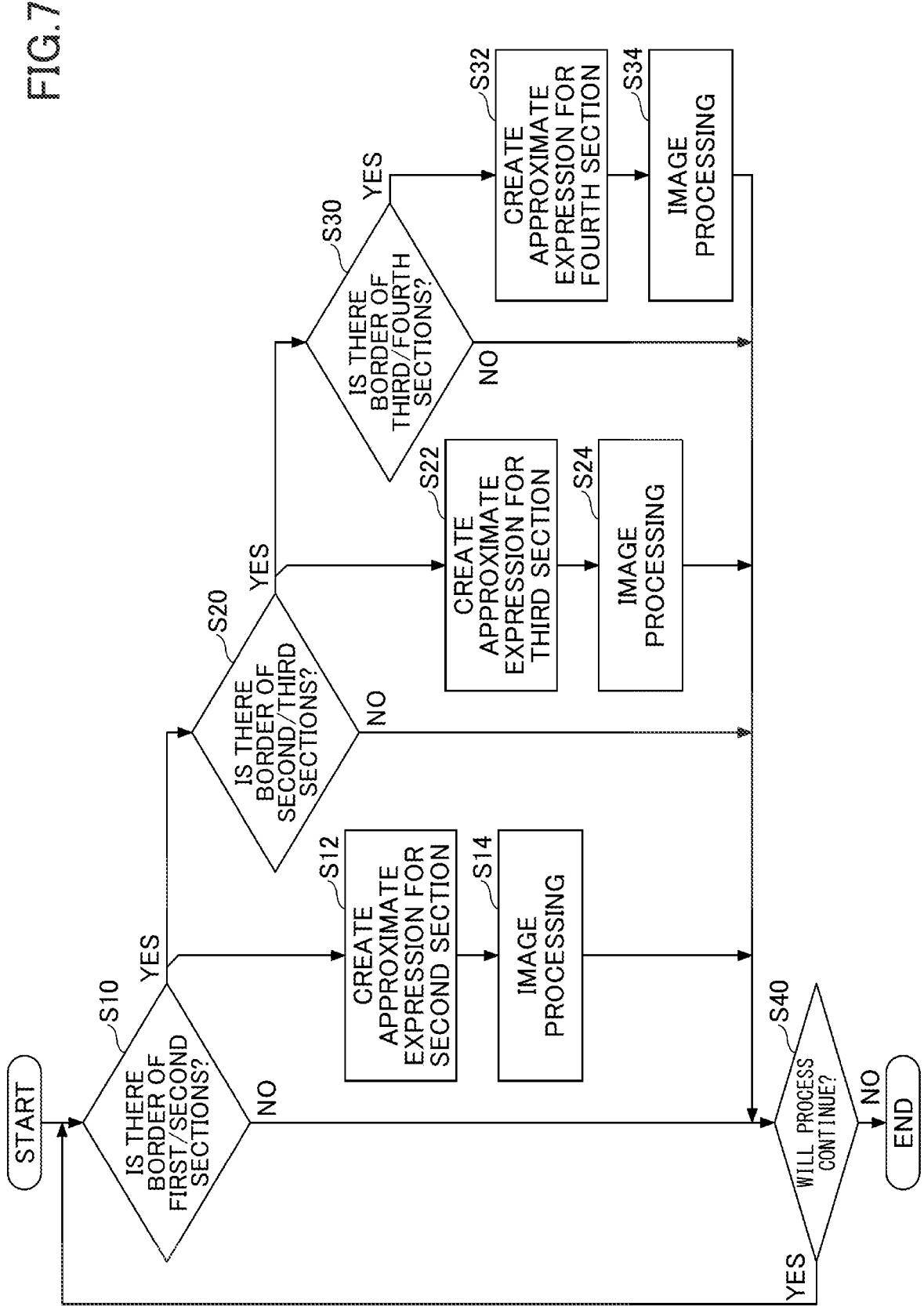
FIG. 7 is a flowchart that illustrates an example of a pixel value prediction method performed by the image processing device of FIG. 3.

FIG. 7 shows an example of a pixel value prediction method implemented by the image processing device 10 of FIG. 3. That is, FIG. 7 shows an example image processing method by the image processing device 10. The flow shown in FIG. 7 is implemented, for example, as an image processing program on a CPU of the image processing device 10. Specific examples of the image processing method implemented by the image processing device 10 will be described with reference to FIG. 8 onwards.

Note that the flow shown in FIG. 7 may be implemented by hardware such as an FPGA (Field-Programmable Gate Array) or an ASIC (Application-Specific Integrated Circuit) mounted on the image processing device 10. Alternatively, the flow shown in FIG. 7 may be implemented by making hardware and software cooperate.

For example, one loop of the process shown in FIG. 7 may be performed per pixel in the raster scan rows shown in FIG. 5. Note that, in the image IMG shown in FIG. 5, if the sun S is in the left corner of the image IMG, the first section to the fourth section are ordered from right to left. Also, in the image IMG shown in FIG. 5, if the sun S is near the center of the image IMG, the first section to the fourth section ordered from left to right in the image IMG and the first section to the fourth section ordered from right to left in the image IMG exist.

First, in step S10, if the image processing device 10 detects the border between the first section and the second section based on at least one of the G value, R value, and B value, the image processing device 10 executes steps S12 and S20. If the image processing device 10 does not detect the border between the first section and the second section, the image processing device 10 executes step S40.

In step S12, the image processing device 10 creates approximate expressions for calculating the pixel values that exceeded the upper limit value in the second section, by calculating the parameters of the approximate expressions. Next, in step S14, using the approximate expressions with the calculated parameters configured therein, the image processing device 10 executes image processing for calculating the pixel values that exceeded the upper limit value. Subsequently, the process moves on to step S40.

In step S20, if the image processing device 10 detects the border between the second section and the third section based on at least one of the G value, R value, and B value, the image processing device 10 executes steps S22 and S30. If the image processing device 10 does not detect the border between the second section and the third section, the image processing device 10 executes step S40.

In step S22, the image processing device 10 creates approximate expressions for calculating the pixel values that exceeded the upper limit value in the third section, by calculating the parameters of the approximate expressions. Next, in step S24, using the approximate expressions with the calculated parameters configured therein, the image processing device 10 executes image processing for calculating the pixel values that exceeded the upper limit value. Subsequently, the process moves on to step S40.

In step S30, if the image processing device detects the border between the third section and the fourth section based on at least one of the G value, R value, and B value, the image processing device 10 executes steps S32. If the image processing device 10 does not detect the border between the third section and the fourth section, the image processing device 10 executes step S40.

In step S32, the image processing device 10 creates approximate expressions for calculating the pixel values that exceeded the upper limit value in the fourth section, by calculating the parameters of the approximate expressions. Next, in step S34, using the approximate expressions with the calculated parameters configured therein, the image processing device 10 executes image processing for calculating the pixel values that exceeded the upper limit value. Subsequently, the process moves on to step S40.

In step S40, the image processing device 10 returns to step S10 if it continues the image processing, or finishes the process shown in FIG. 7 if the image processing device 10 does not continue the image processing, such as when the processing of one screen is completed, for example. Note that the image processing device 10 may perform image processing such as noise cancellation processing or edge enhancement processing after step S40, before returning to step S10.

Figure 9:
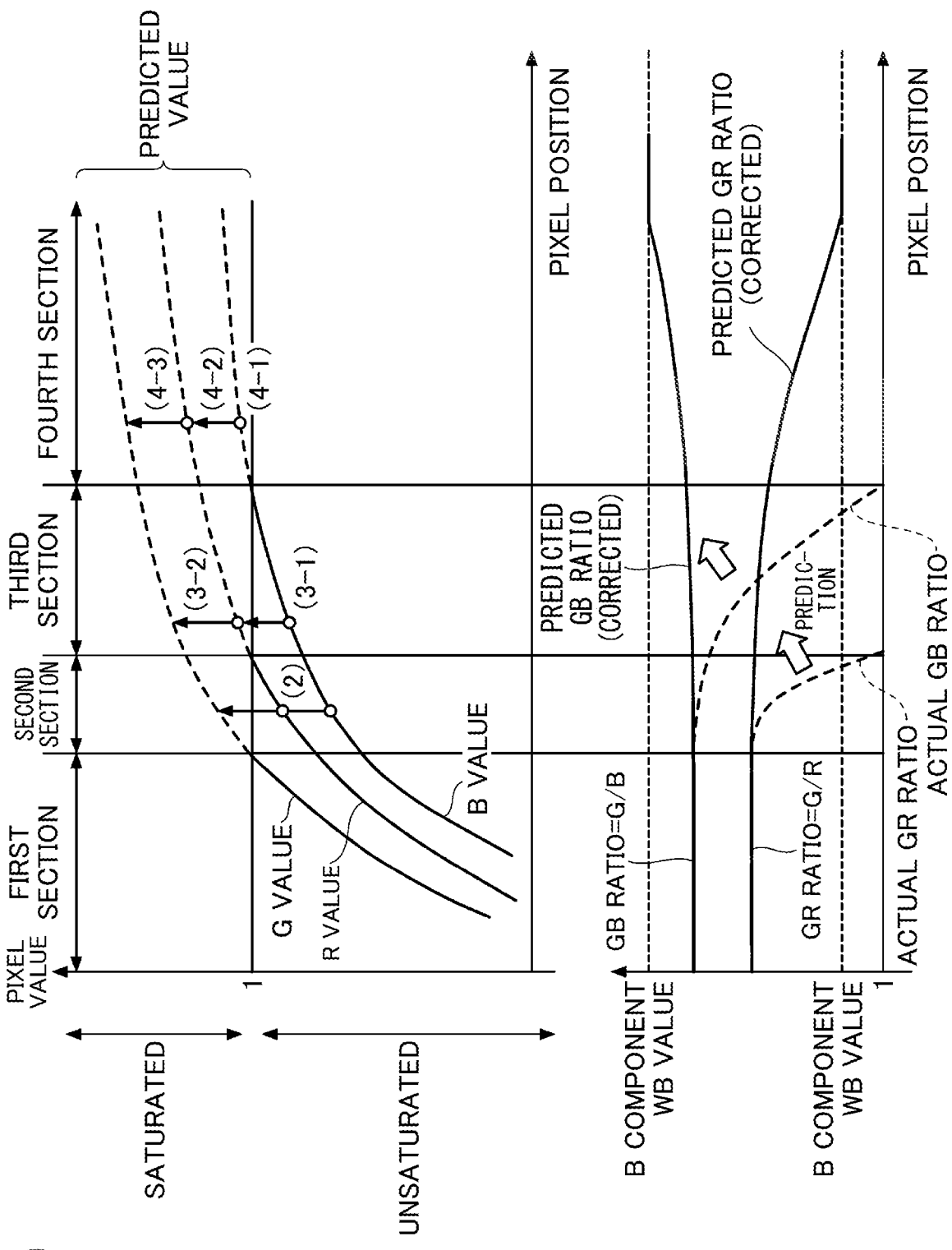
FIG. 9 is a diagram for explaining an example of pixel value prediction in the first prediction process explained in FIG. 8.
Figure 10:
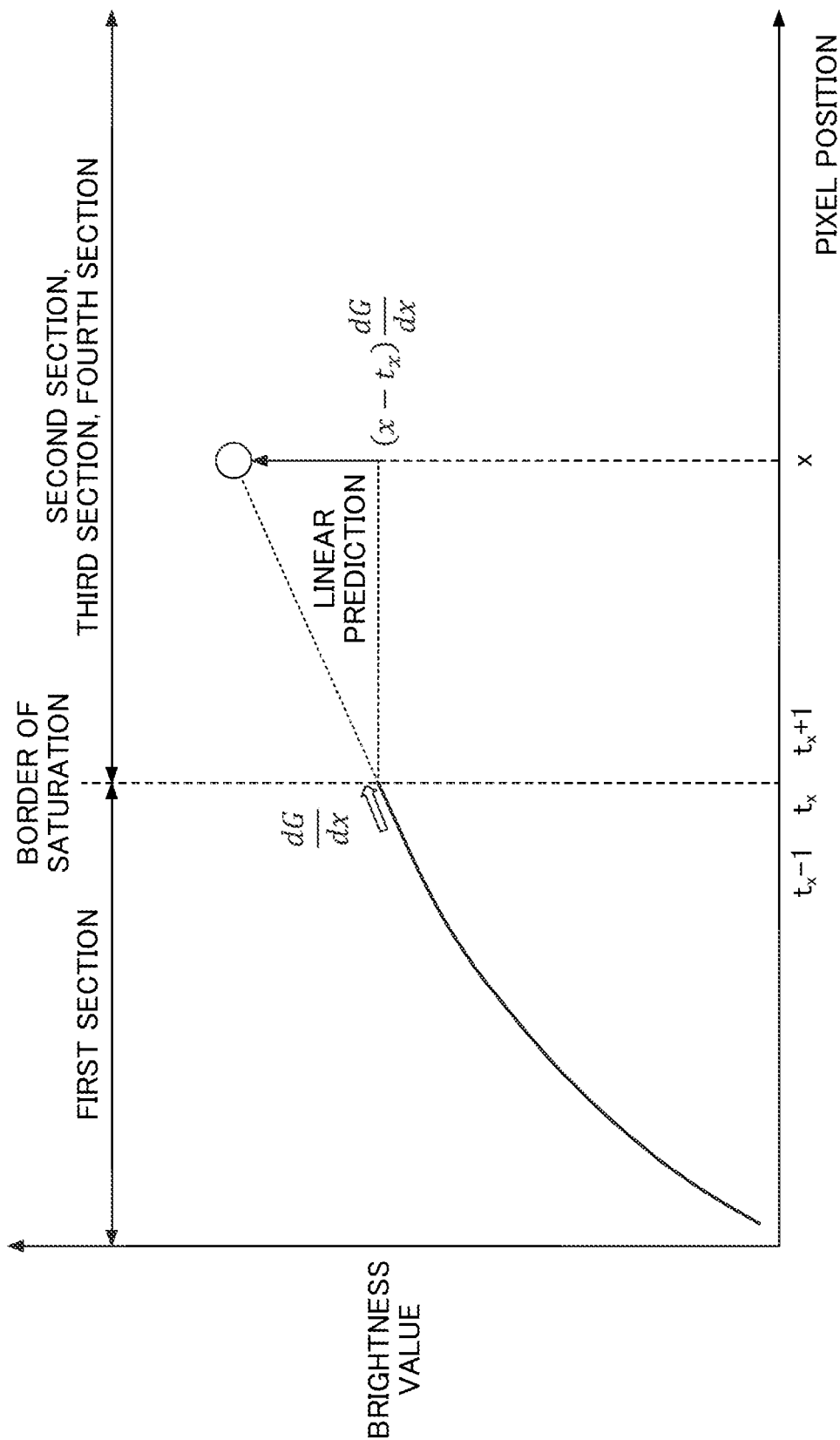
FIG. 10 is a diagram for explaining an example of pixel value prediction in the second prediction process explained in FIG. 8.

FIG. 8 shows examples of approximate expressions used in the image processing of FIG. 7. In the expressions in each section, when the symbol "——" is attached above the codes G, R, and B, it indicates that they are predicted pixel values. That is, in the following description, predicted pixel values will be referred to as pixel values "G——," "R——," and "B——." The dotted underlines show examples of approximate expressions used in the prediction based on components of different colors in the first prediction process. The dashed-dotted underlines show examples of approximate expressions used in the prediction based on unsaturated base-color components in the second prediction process. FIG. 9 shows an example of pixel value prediction based on the first prediction process, and FIG. 10 shows an example of pixel value prediction based on the second prediction process.

The code "α" is the rate at which the first prediction process is applied, and the code "1-α" is the rate at which the second prediction process is applied. That is, the code α is the blending ratio, which is a predetermined ratio at which pixel values predicted in the first prediction process and pixel values predicted in the second prediction process are combined. When α=1 holds, only the first prediction process (prediction based on components of different colors) is applied. When α=0 holds, only the second prediction process (prediction based on unsaturated components of a base color) is applied.

By applying the blending ratio α, it becomes possible to appropriately blend the pixel values predicted in the first prediction process and the pixel values predicted in the second prediction process according to the characteristics of the photographing object (image data), so that the accuracy of pixel value prediction in unsaturated areas can be improved.

In each expression, "R" is the pixel value of the R component, and "B" is the pixel value of the B component. The coefficient $a_R$ is a coefficient for calculating a pixel value R—— from a pixel value R or pixel value R——. The coefficient $a_B$ is a coefficient for calculating a pixel value G—— or pixel value R—— from a pixel value B or pixel value B——. For example, the coefficients $a_R$ and $a_B$ and the blending ratio α are parameters to be configured in each approximate expression to calculate the pixel values G——, R——, and B——.

The coefficient $a_R$ is a predicted GR ratio, as shown in expression (5-1). The predicted GR ratio is the ratio "G value/R value (P1/P2)" between the G value (P1) of G, which is the color of interest in the first section, and the R value (P2) of a different color R. The coefficient $a_B$ is a predicted GB ratio, as shown in expression (5-2). The predicted GB ratio is the ratio "G value/B value (P1/P2)" between the G value (P1) of G, which is the color of interest, and the B value (P2) of a different color B. The predicted GR ratio and predicted GB ratio are preferably calculated on the border with the second section, where the variation of the pixel values is the largest in the first section.

The code "β" is the rate at which expression (5-1) and expression (5-2) are applied. That is, the code β indicates the priorities (weights) of the predicted GR ratio and the predicted GB ratio. If β=1 holds, only the predicted GR ratio is applied; if β=0 holds, only the predicted GB ratio is applied. Note that, since the difference between the pixel values G and B is larger than the difference between the pixel values G and R, using the predicted GB ratio tends to make the accuracy of prediction of the pixel value G—— higher. Therefore, it is preferable to make β small and make the weight of the predicted GB ratio greater than the weight of the predicted GR ratio.

In this way, by applying the priority β, it becomes possible to appropriately determine which of the pixel values R and B is used preferentially, according to the characteristics of the photographing object (image data), so that it is possible to improve the accuracy of pixel value prediction in unsaturated areas.

The coefficient $a_c$ is not used in this embodiment and therefore set to "0," as shown in expression (5-3). Note that a predicted RB ratio, which is the ratio of the R value to the B value (R value/B value) in the first section, may be used in approximate expressions.

In the fourth section, where all colors have saturated pixel values, the first prediction process cannot be applied until one pixel value is predicted. Therefore, in the fourth section, as shown in expression (4-1), the image processing device 10 first calculates the pixel value B—— by using the second prediction process, and, by using the pixel value B—— calculated thus, calculates the pixel values R—— and G——.

Expression (4-1) is an expression that replaces the code G in expression (6-2) with a code B. Expressions (6-1) and (6-2) show examples of predicting G values in saturated sections by using G-value components. In expressions (4-1), (6-1), (6-2), and (6-3), the code x is the coordinate of the image in the horizontal direction (the direction of raster scanning FIG. 5), and the code y is the coordinate of the image in the vertical direction.

Expression (6-1) shows that a derivative of pixel values is determined from the difference between the pixel value $G(t_x, y)$ of a border pixel located adjacent to the pixel value's saturated section and the pixel value $G(t_x-1, y)$ of a different border pixel. Border pixels are included in unsaturated sections (for example, the first section in FIG. 6). The code $t_x$ is the horizontal position (coordinate) of a border pixel, and the code $t_x-1$ is the horizontal position (coordinate) of the pixel immediately before the pixel located adjacent to the saturated area among the border pixels.

The first term in expression (6-2) is the pixel value $G(t_x, y)$ of a border pixel that is located adjacent to a saturated section. The second term in expression (6-2) is the product of the horizontal distance between a predicted pixel x, which is subject to pixel value prediction, and a border pixel $t_x$, and the derivative determined in expression (6-1). That is, the second term in expression (6-2) is the amount of change in pixel value (predicted value) from the border pixel $t_x$ to the predicted pixel x.

Expressions (6-1) and (6-2) show examples of linear prediction of pixel values by applying first-order differentiation. However, as shown with expression (6-3), pixel values may be approximated by a quadratic function by applying second-order differentiation. Furthermore, this may be expanded to an n-th order function. In this case, the processing becomes equivalent to applying the Taylor expansion to the change in the pixel values of the border pixel $t_x$.

FIG. 9 shows an example of pixel value prediction in the first prediction process described with FIG. 8. In the first prediction process, the image processing device 10 predicts the pixel value of a base color based on components of different colors. In FIG. 9, the coefficient a in FIG. 8 is configured to "0." The image processing device 10 calculates a predicted GR ratio (G value/R value) and a predicted GB ratio (G value/B value) by using the G value, R value, and B value in the first section, where none of the colors is saturated.

In the second section, at each pixel position, the image processing device 10 adds the product of the coefficient $a_R$ and the pixel value R and the product of the coefficient $a_R$ and the pixel value B, by using the first term in expression (2) of FIG. 8, thereby calculating a pixel value G—.

In the third section, at each pixel position, the image processing device 10 first calculates a pixel value R— from the product of the coefficient $a_R$ and the pixel value B, by using the first term in expression (3-1) in FIG. 8. Next, using the first term in expression (3-2) of FIG. 8, the image processing device 10 calculates a pixel value G— by adding the product of the coefficient $a_R$ and a pixel value R— and the product of the coefficient $a_B$ and the pixel value B.

In the fourth section, at each pixel position, the image processing device 10 calculates a pixel value B— by using expression (4-1) of FIG. 8. Next, at each pixel position, the image processing device 10 calculates the pixel value R— from the product of the coefficient $a_B$ and the pixel value B—, by using the first term in expression (4-2) of FIG. 8. Next, using the first term in expression (4-3) of FIG. 8, the image processing device 10 calculates the pixel value G— by adding the product of the coefficient $a_R$ and the pixel value R— and the product of the coefficient $a_B$ and the pixel value B—. Thus, by means of the first prediction process, pixel values in saturated areas can be predicted by using the ratios of pixel values of different colors in unsaturated areas.

As described above, the parameters of approximate expressions are determined in the first prediction process. Note that the accuracy of prediction of the pixel values G—, R—, and B— by the image processing device 10 might decrease as they move further away from unsaturated sections. So, for example, the image processing device 10 corrects the predicted GR ratio and the predicted GB ratio such that that the predicted GR ratio and the predicted GB ratio are closer to achromatic colors as they move further away from unsaturated sections. The lower part of FIG. 9 shows corrected curves of the predicted GR ratio and the predicted GB ratio.

The corrected curve of the predicted GR ratio is configured such that the predicted GR ratio becomes the white balance value (WB) of the R component at a predetermined pixel position in the fourth section where all of the RGB colors are saturated. The corrected curve of the predicted GB ratio is configured such that the predicted GB ratio becomes the white balance value of the B component at a predetermined pixel position in the fourth section. For example, since the calculation of the white balance value of the B component involves the product of the B value and the white balance value of the B component, G value=B value (achromatic color) holds after the white balance is corrected.

By this means, even in the fourth section where the G value, R value, and B value are all saturated, it is possible, for example, to prevent the color of an image after the pixel values are corrected, from being far from the true color of the photographing object. As a result of this, when image data including pixel values G—, R—, and B— predicted in the first prediction process, is compressed and displayed on the display device 12, as will be described later with reference to FIG. 11, it is possible to display an image that looks natural.

Note that the G value, R value, and B value that are output from the imaging device 19 are fixed to an upper limit value (for example, 255) after saturation. Therefore, the actual GR ratio decreases gradually in the second section, and becomes 1.0 at the end of the second section. The actual GB ratio decreases gradually over the second section and the third section, and becomes 1.0 at the end of the third section.

FIG. 10 shows an example of pixel value prediction in the second prediction process described with FIG. 8. In the second prediction process, the image processing device 10 predicts the pixel value of a base color by using components of the base color in unsaturated sections. FIG. 10 shows the method of predicting the pixel value G—, but the method of predicting the pixel value R— and the pixel value B— is the same as the method of predicting the pixel value G—.

First, as shown in expression (6-1) of FIG. 8, the image processing device 10 calculates a derivative dG/dx, which is the gradient of change in the G value at the border (saturation border) between the first section, in which the G value is saturated, and the second section. Next, the image processing device 10 applies the calculated derivative dG/dx to expression (6-2) of FIG. 8, thereby predicting the pixel value G— at a given pixel position x in the second, third, and fourth sections. Thus, the second prediction process can predict pixel values by using the rate of change of the pixel value of a component of a base color.

Figure 11:
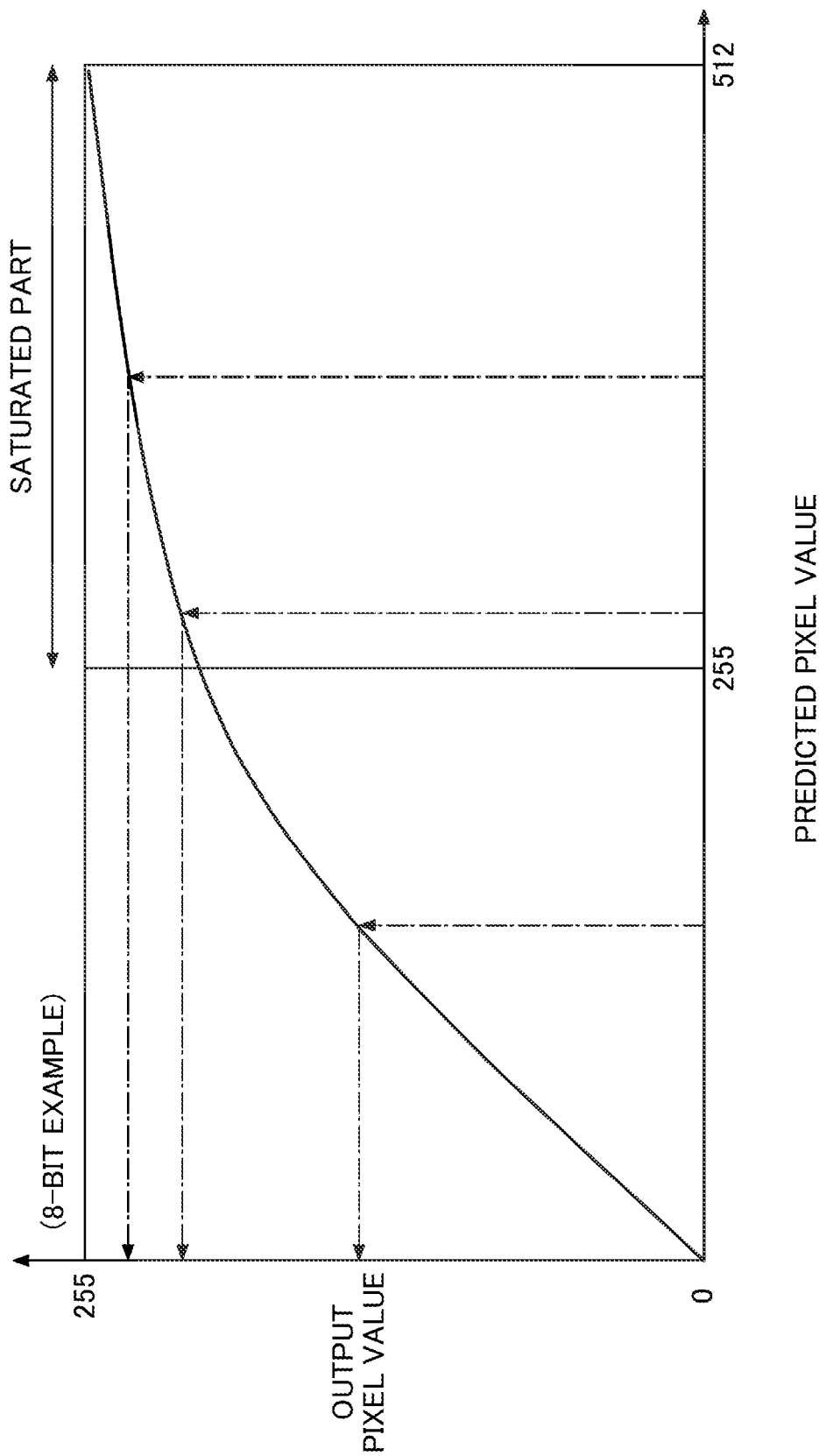
FIG. 11 is a diagram for explaining an example method of compressing pixel values that are predicted in at least one of the first prediction process and the second prediction process.

FIG. 11 illustrates an example technique for compressing pixel values predicted in at least one of the first prediction process and the second prediction process. If predicted pixel values are greater than the upper limit pixel value that can be displayed on the display device 12 installed in the mobile entity 200, the image displayed on the display device 12 has blown-out highlights. Therefore, the image processing device 10 has a function to compress predicted pixel values. In FIG. 11, assume that the maximum value of pixel values that can be displayed on the display device 12 is "255," and the maximum value of predicted pixel values is "512."

Using a predetermined conversion expression applicable to the maximum value of predicted pixel values, the image processing device 10 converts the predicted pixel values into pixel values that can be displayed on the display device 12. That is, after the image processing device 10 predicts the pixel values in the saturated area in the image data, the image processing device 10 then compresses the pixel values of each pixel in the image data such that the maximum value of the predicted pixel values stays within the pixel values of the unsaturated area.

Then, the image processing device 10 outputs the converted pixel values to the display device 12 as output pixel values. By this means, even when predicted pixel values are greater than the maximum pixel value that can be displayed on the display device 12, it is still possible to display the image on the display device 12 with reduced blown-out highlights.

Note that the parameters in the conversion expression for converting predicted pixel values to output pixel values may vary depending on the maximum value of predicted pixel values. Note that, in order to prevent the hue of the image displayed on the display device 12 from changing, for example, when the pixel value G⁻ is compressed, it is preferable to also compress the pixel values R and B that are not saturated.

The image processing device 10 may freely set the range of pixel values to be compressed in one screen image. For example, in FIG. 5, the image processing device 10 may only compress the pixel values in the area of the sky in the image. Also, the image processing device 10 may divide an image into partial images of a predetermined size and compress the pixel values of partial images including pixels with saturated pixel values. Note that the image processing device 10 may apply a smoothing process to border parts between compressed areas and uncompressed areas so as to prevent pixel values from changing unsmoothly and showing an unnatural look.

Note that, when the information processing device 11 of FIG. 3 performs an image recognition process and the like by using image data including predicted pixel values, the image processing device may output the image data including predicted pixel values without compression. In this case, the image processing device 10 may output the image data including predicted pixel values to the information processing device 11 via the secondary memory device 23 or memory device 24 of FIG. 4.

As described above, according to this embodiment, when pixel values of the photographing object captured by the imaging device 19 are greater than the upper limit value of pixel values that the imaging device 19 can capture, it is still possible to predict correct pixel values. For example, in the first prediction process, the image processing device can predict a pixel value in a saturated area by using the ratio of pixel values of different colors in an unsaturated area. Also, in the second prediction process, the image processing device 10 can predict a pixel value in a saturated area by using the rate of change of the pixel value of a component of a base color.

By this means, even when the image processing device 10 receives saturated pixel values from the imaging device 19, pixel values that correspond to the actual brightness value of the photographing object can be calculated as predicted values. As a result of this, the image processing device 10 can correct image data including pixel values of an area where there is a blown-out highlight, to image data without a blown-out highlight, and carry out an accurate image recognition process by using the corrected image data.

Also, by compressing the pixel values of image data including corrected pixel values, the display device 12 can display the image of the photographing object without blown-out highlights even when the brightness of the photographing object is high. As a result of this, the quality of the image displayed on the display device 12 can be improved.

By applying the blending ratio α, the image processing device 10 can blend pixel values predicted in the first prediction process and pixel values predicted in the second prediction process appropriately, depending on the characteristics of the photographing object (image data). For example, by changing the blending ratio α according to the environment (the weather, the degree of sunshine, the time of the day, etc.) in which the image processing device 10 is used, it is possible to improve the accuracy of pixel value prediction in unsaturated areas. Also, by changing the blending ratio α according to the characteristics of the photographing object's image, it is possible to improve the accuracy of pixel value prediction in unsaturated areas.

In the first prediction process, corrected pixel values in the fourth section may be converged to a white balance value, so that it is possible to prevent the color of the image after the pixel values are corrected, from being far from the true color of the photographing object. As a result of this, when the pixel values of image data including corrected pixel values are compressed and displayed on the display device 12, a natural image can be displayed.

Second Embodiment

Figure 12:
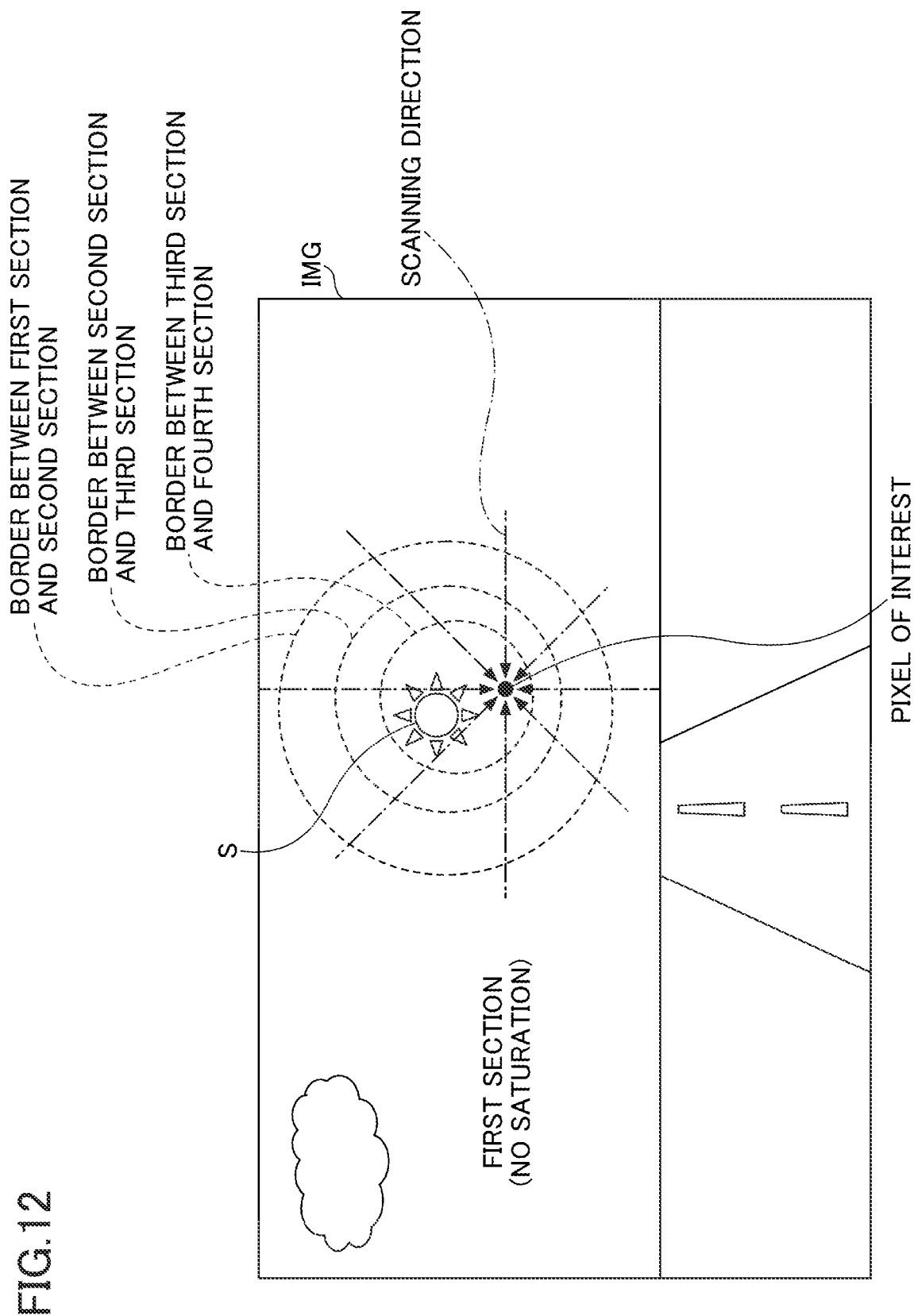
FIG. 12 is a diagram for explaining an example of image processing performed by an image processing device according to a second embodiment.

FIG. 12 shows an example of image processing performed by an image processing device according to a second embodiment. The image processing device 10 of this embodiment and the image processing system 100 including the image processing device 10 have the same structure as in FIG. 1 to FIG. 4.

In the image processing of the first embodiment, the first section to the fourth section are arranged from left to right in order, in the image IMG. However, when photographing a real object, as shown in FIG. 12, the first section to the fourth section vary in position, size, shape, and so forth. Also, straight lines cross the borders between sections in multiple directions.

Therefore, with this embodiment, the image processing device 10 predicts pixel values that are greater than the upper limit value, in each scanning direction crossing the border between sections. In order to identify the borders between sections, the image processing device 10 ascertains the distribution of the first section to the fourth section in the image IMG (the circular dashed lines in FIG. 12) while photographing the photographing object. By ascertaining the distribution thus, the image processing device 10 can detect the pixels having pixel values greater than the upper limit value, for each color.

Then, the image processing device 10 determines multiple directions (scanning directions) to use to predict the pixel value of each pixel included in the second section to the fourth section with a pixel value greater than the upper limit value. In the example shown in FIG. 12, eight scanning directions toward a pixel of interest, represented by the black circle included in the fourth section, are shown, but the number of scanning directions is by no means limited to eight.

Next, in each scanning direction, the image processing device 10 calculates the parameters of approximate expressions, for each pixel, by using at least one of the first prediction process (prediction based on components of different colors) and the second prediction process (prediction based on unsaturated components of a base color) described in the first embodiment. Using the parameters calculated per scanning direction, the image processing device 10 predicts the pixel value of each color having a pixel value greater than the upper limit value.

Then, the image processing device 10 calculates predicted pixel values of the pixel of interest by finding a weighted average of the pixel values of the pixel of interest that are predicted for each color, in multiple scanning directions, in accordance with the distance to the saturation border, which is the border between the unsaturated area and the saturated area. Although FIG. 12 shows one pixel of interest in the fourth section, the image processing device 10 sets all the pixels included in the second section, third section, and fourth section as pixels of interest in order, and acquires the pixel values of colors having pixel values greater than the upper limit value in each pixel. Then, for every pixel of interest, the image processing device 10 predicts pixel values in multiple scanning directions and calculates their weighted average. Note that the image processing device 10 may compress the acquired predicted pixel values, as described earlier with FIG. 11.

As described above, according to this embodiment, as in the above-described embodiment, even when the photographing object captured by the imaging device 19 has pixel values greater than the upper limit pixel value that the imaging device 19 can capture, it is still possible to predict correct pixel values. Furthermore, according to this embodiment, correct pixel values can be predicted regardless of whether the photographing object is in a position of high brightness. In so doing, a weighted average of pixel values predicted in multiple scanning directions may be determined according to the distance to the saturation border, so that the accuracy of pixel value prediction can be improved, compared to when pixel values are predicted in a single scanning direction.

Third Embodiment

Figure 13:
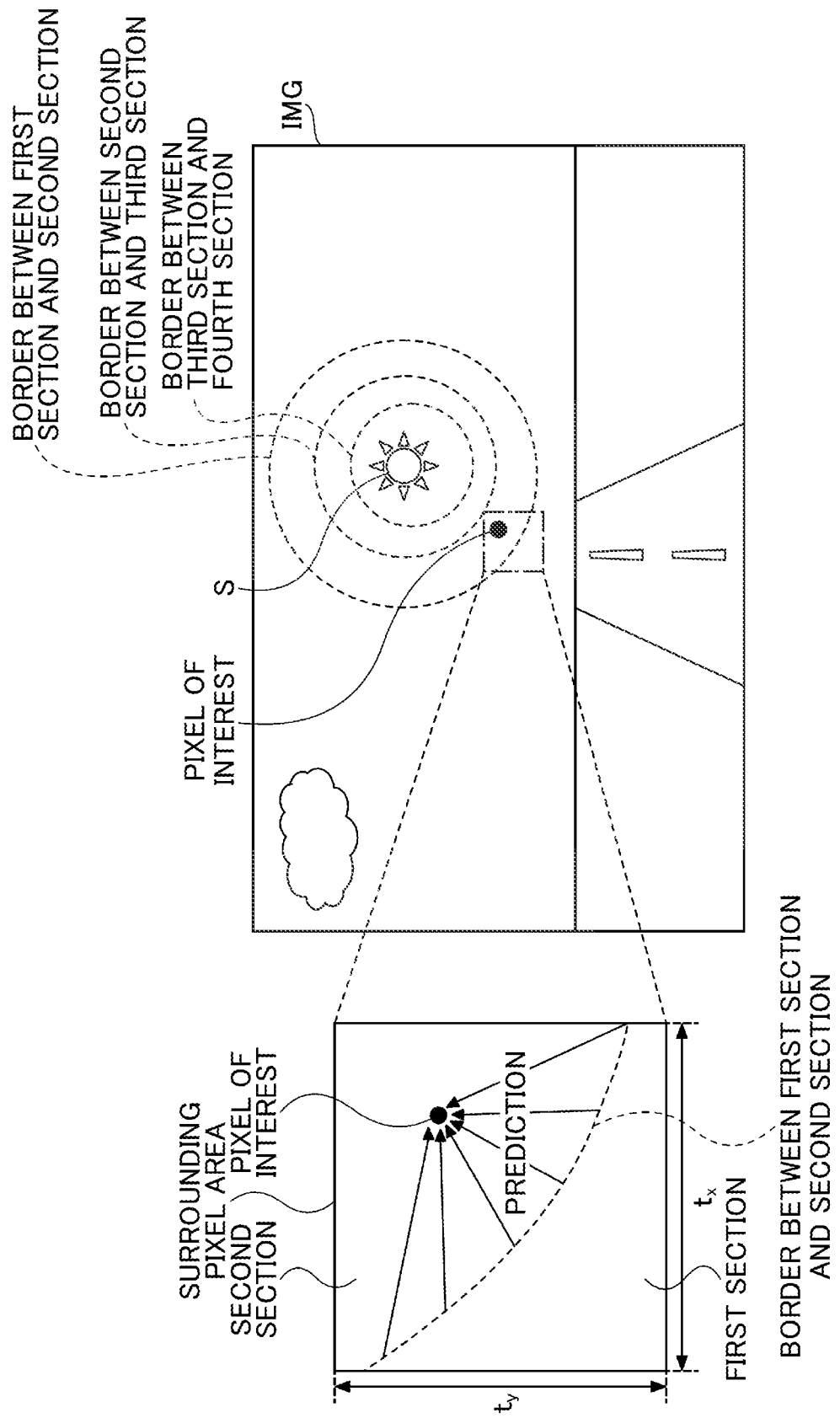
FIG. 13 is a diagram that illustrates an example of image processing performed by an image processing device according to a third embodiment.

FIG. 13 shows an example of image processing performed by an image processing device according to a third embodiment. Detailed descriptions of elements that are the same as in the above-described embodiments will be omitted. The image processing device 10 of this embodiment and the image processing system 100 including the image processing device 10 have the same structure as in FIG. 1 to FIG. 4.

In the first and second embodiments, pixel values are predicted in one-dimensional (linear) scanning directions. In this case, linear artifacts (noise) might be produced depending on the scanning direction. Therefore, with this embodiment, the image processing device 10 does not perform a process that depends on scanning directions; instead, the image processing device 10 performs filtering on surrounding pixels around the pixel of interest that is subject to pixel value prediction. By this means, it is possible to eliminate a process that depends on scanning directions, and prevent artifacts from appearing.

Note that FIG. 13 shows an example of acquiring pixel values with respect to a pixel of interest included in the second section. However, the image processing device 10 sets all the pixels included in the second section, third section, and fourth section as pixels of interest in order, and predicts the pixel values of colors having pixel values greater than the upper limit value in each pixel. Also, the image processing device 10 may compress the acquired predicted pixel values, as described earlier with FIG. 11.

The codes "tx" and "ty" in FIG. 13 show the range of a surrounding pixel area, in which the pixels to use to predict the pixel values of the pixel of interest are included. The image processing device performs an extraction process to extract a border area from the surrounding pixel area including the pixel of interest. Here, the border area refers to an area that, in the unsaturated area of pixels of the same color as the pixel of interest, is located adjacent to the border with the saturated area, and that includes a predetermined number of pixels (border pixels) in directions toward the unsaturated area. In the following description, the pixel values of border pixels will be also referred to as "border pixel values."

Using the pixel values of border pixels included in the surrounding pixel area, the image processing device 10 predicts the pixel values of the pixel of interest. For example, in the first section in FIG. 13, using the pixel values of border pixels in the border area that is located adjacent to the border of the second section, which is the G value's unsaturated area, the pixel value of the green G pixel of interest in the second section is predicted.

Then, based on multiple border pixel values, the image processing device 10 calculates the parameters of approximate expressions by using at least one of the first prediction process (prediction based on components of different colors) and the second prediction process (prediction based on unsaturated components of a base color). Using the parameters calculated thus, the image processing device 10 predicts the pixel value of each color that has a pixel value greater than the upper limit value.

Furthermore, the image processing device 10 finds a weighted average of predicted pixel values predicted per color, according to the distance from the border pixel to the pixel of interest, and determines the predicted pixel value of each color having a pixel value greater than the upper limit value of the pixel of interest. Examples of calculation of predicted pixel values in the first prediction process and the second prediction process will be described with reference to FIG. 14 and FIG.

FIG. 14 shows examples of approximate expressions in the event the pixel value prediction shown in FIG. 13 is performed by using the first prediction process (prediction based on components of different colors). Although FIG. 14 shows an example of calculating predicted pixel values of the pixel G, it is equally possible to calculate predicted pixel values of the pixel R and the pixel B in the same manner.

For example, similar to the first term in expression (2) and expressions (5-1), (5-2), and (5-3) of FIG. 8, a method of predicting the coefficients $a_R$ and $a_B$ from unsaturated pixels around the pixel of interest may be used. As described earlier, the coefficient $a_R$ is calculated from the ratio of G and R, and the coefficient $a_B$ is calculated from the ratio of G and B. However, since there are multiple unsaturated pixels, it is preferable to find a weighted average according to distance.

The function V(tx, ty) shown in expression (7-1) is used in the term C of approximate expression (7-2) for calculating the predicted GR ratio. The function V(tx, ty) is applied to each pixel in the surrounding pixel area in FIG. 13, and returns "1" for unsaturated pixels (including border pixels) and returns "0" for saturated pixels. As a result of this, in approximate expression (7-2), it is possible to mask the saturated pixels and predict the predicted GR ratio by using only the unsaturated pixels.

The approximate expression (7-2) for calculating the predicted GR ratio indicates that the calculation is performed with all the surrounding pixels in the surrounding pixel area in FIG. 13 and a total sum is calculated. As for the term B in approximate expression (7-2), a function that represents the weight of the distance from the pixel of interest to a surrounding pixel in the saturation border, and that makes the weight lighter according to distance is used. In this embodiment, an expression that represents the weight of distance, similar to one that is used in a bilateral filter or the like, is used, but other expressions may be used as long as they are computational expressions that give lighter weights according to distance.

Assuming that the surrounding pixel area includes no saturation border, the term D of approximate expression (7-2) is a term for converging approximate expression (7-2) to a fixed pixel value that is configured in advance. If all the pixels in the surrounding pixel area are saturated pixels and there is no saturation border, the term C is "0." It then occurs that the calculation results of the terms A, B, and C of approximate expression (7-2) are "0," and the term E is also "0." As a result of this, the predicted value of the pixel of interest predicted by approximate expression (7-2) is a fixed value "C." The fixed value C is preferably configured to the white balance value WB, as described earlier with FIG. 9.

The predicted GB ratio can be calculated by configuring the parameters of approximate expression (7-2) for the R component.

Note that the coefficient a may be calculated directly by using the least squares method. In the first term of expression (2), the coefficient a is the variable to be determined; so the coefficient a that minimizes the variation of the predicted pixel value G— may be determined from the pixels in the surrounding pixel area. To be more specific, the coefficient a that minimizes the cost function J shown in expression (7-3) may be calculated. Expression (7-3) is a calculation to use the general least squares method, and enables high-speed calculation by using the technique used in a guided filter.

The term A of expression (7-3) represents the prediction error of the G value in unsaturated pixels, and is an arithmetic expression that needs to be minimized. However, as mentioned earlier, if, for example, all the pixels in the surrounding pixel area are saturated, the function V(tx, ty) of expression (7-1) is all "0," and so no solution can be found.

In order to avoid this problem, the terms B and C of expression (7-3) are provided. The terms B and C of expression (7-3) are the regularization terms in the least squares method. Since the cost function J becomes greater as the coefficient a deviates further from the white balance value WB, the coefficient a is optimized to a value that is close to the white balance value WB. This action allows the coefficient a to converge to the white balance value WB when the function V(tx, ty) is all "0." The code k in the term B and term C in expression (7-3) is the strength of constraint.

Note that expression (7-4) can calculate, dynamically, an appropriate value for the blending ratio α of the first prediction process (prediction based on components of different colors) shown in FIG. 14 and the second prediction process (prediction based on an unsaturated base color) shown in FIG. 15. For example, an expression in which the first and second terms in expression (2) are incorporated may be optimized, and the coefficients a and b shown in expression (7-4) may be calculated by using expression (7-3), so that it becomes unnecessary to determine the blending ratio α. Here, F(x, y, G) of expression (7-4) is calculated in advance by using approximate expression (8-3) of FIG. 15, which will be described later.

FIG. 15 shows examples of approximate expressions when the pixel value prediction shown in FIG. 13 is performed based on the second prediction process (prediction based on an unsaturated base color). Although FIG. 15 shows examples of calculating predicted pixel values of the pixel G, it is equally possible to calculate predicted pixel values for the pixel R and pixel B in the same manner. In FIG. 15, the pixel value of the pixel of interest is predicted by using border pixels among the pixels in the surrounding pixel area.

Generally speaking, there are multiple border pixels in the surrounding pixel area, so that each predicted pixel value is determined by a weighted average according to the distance from the saturated pixel. Also, if there is no sectional border in the surrounding pixel area, expression (8-2) is used to make the predicted pixel values a fixed value.

Expression (8-1) is an expression for approximating differentiation, and used in linear prediction. Like in expression (7-1), the function W(tx, ty) shown in expression (8-2) returns "1" for unsaturated pixels (including border pixels) and returns "0" for saturated pixels. By placing the function V(tx, ty) in place of the term C in approximate expression (8-3), it is possible to mask the pixels other than the border pixels and predict the pixel values only from the border pixels.

Approximate expression (8-3) for calculating the predicted value F(x, y, G) of G indicates that the calculation is performed with all the pixels in the surrounding pixel area in FIG. 13 and a total sum is calculated. The term A of approximate expression (8-3) is a linear predicted value of the pixel of interest with respect to a border pixel. The term A of approximate expression (8-3) is an expression obtained by expanding the one-dimensional linear prediction expression shown in FIG. to a two-dimensional one. Note that, unlike the first embodiment in which linear expressions are used, the approximation here may use multi-dimensional expressions including linear expressions.

The term B of approximate expression (8-3) is the weight of the distance from the pixel of interest to a border pixel, and a function to make the weight lighter according to the distance is used here. In this embodiment, an expression that is similar to an expression that represents the weight of distance, such as one used in a bilateral filter or the like, may be used. Note that other expressions may be used as well as long as they are arithmetic expressions that make the weight lighter according to distance.

Similar to the term D of approximate expression (7-2), the term D of approximate expression (8-3) converges approximate expression (8-3) to a fixed value when there are no border pixels in the surrounding pixel area. The fixed value C is preferably configured to the white balance value WB. The term E (denominator) of approximate expression (8-3) is a normalization term for the weighted averaging process.

As described above, this embodiment can also bring about the same effect as the above-described embodiments. Furthermore, in this embodiment, the image processing device 10 predicts pixel values by using border pixels that are extracted from the pixel values of pixels in the surrounding pixel area around the pixel of interest that is subject to pixel value prediction, and finds a weighted average of the predicted pixel values according to distance, thereby calculating predicted pixel values. By this means, it is possible to eliminate a process that depends on scanning directions, and prevent artifacts from appearing. Also, if no border pixels are included in the surrounding pixel area, the predicted pixel values may be configured to a preconfigured fixed pixel value, so that it is possible to predict pixel values in the saturated area correctly even when no border pixels can be extracted.

Note that, for example, when predicting pixel values for the current image of interest, the image processing device 10 captures the image and then solves the approximate expressions. Consequently, it takes time from the capturing of the image to the completion of pixel value prediction, or from the capturing of the image to the display of the image on a display device or the like based on predicted pixel values. Also, for example, when the imaging device 19 captures an image of a photographing object by raster scanning as shown in FIG. 5, the parameters of approximate expressions that are used to calculate predicted pixel values might not be determined until the entirety of the image is captured.

Therefore, the image processing device 10 of the first to third embodiments described above might use the image captured immediately before, or an image captured prior to the image currently being captured, to determine the parameters of approximate expressions. Then, using the parameters calculated thus, the image processing device 10 performs pixel value prediction with respect to the image currently being captured. By this means, it is possible to quickly perform the process of predicting pixel values with respect to the image that is currently being captured, and thus improve the real-time performance. In particular, by applying the technique disclosed herein to fields in which real-time image processing is required, such as the case with imaging devices 19 installed in the mobile entity 200, the performance of image recognition and the like can be improved.

The present invention has been described above based on embodiments, but is by no means limited to the requirements shown in the above embodiments. These requirements can be changed within a scope that does not impair the gist of the present invention, and can be determined appropriately according to the mode of application.

The invention claimed is:

1. An image processing device comprising:
an extracting part configured to extract an unsaturated area, in which pixel values are not saturated, and a saturated area, in which pixel values are saturated, from image data that is captured by an imaging device and that shows an image including a plurality of pixels; and
a prediction part configured to predict a pixel value of a pixel of interest in the saturated area based on pixel values of a plurality of border pixels in a border area, the border area being located in the unsaturated area and bordering the saturated area,
wherein the image data is captured for each of the plurality of pixels having a plurality of colors,
wherein the extracting part extracts the unsaturated area and the saturated area from each image data of the plurality of colors, and
wherein the prediction part performs a first prediction process of predicting a pixel value of a color of interest in the saturated area, the color of interest being one of the plurality of colors, based on a ratio of the pixel value of the color of interest in the border area to a pixel value of another color that is not saturated.

2. The image processing device according to claim 1, wherein the prediction part varies P1/P2, which is the ratio of the pixel value of the color of interest, P1, to the pixel value of the another color that is not saturated, P2, to converge to a white balance value of the another color at one pixel position in a completely saturated area where all pixel values of the plurality of colors are saturated.

3. The image processing device according to claim 1, wherein the prediction part performs a second prediction process of predicting the pixel value of the pixel of interest based on an amount of change in pixel values of a plurality of border pixels of a same color as the pixel that is subject to pixel value prediction, and that are along a direction toward the saturated area.

4. The image processing device according to claim 1,
wherein the image data is captured for each of the plurality of pixels having a plurality of colors,
wherein the extracting part extracts the unsaturated area and the saturated area from each image data of the plurality of colors, and
wherein the prediction part:
performs a first prediction process of predicting a pixel value of a color of interest in the saturated area, the color of interest being one of the plurality of colors, based on a ratio of the pixel value of the color of interest in the border area to a pixel value of another color that is not saturated,
performs a second prediction process of predicting the pixel value of the pixel of interest based on an amount of change in pixel values of a plurality of border pixels of a same color as the pixel that is subject to pixel value prediction, and that are along a direction toward the saturated area, and
combines the pixel value predicted in the first prediction process and the pixel value predicted in the second prediction process at a predetermined ratio.

5. The image processing device according to claim 1, wherein the prediction part predicts the pixel value of the pixel of interest by determining a weighted average of a plurality of pixel values of the pixel of interest that are predicted based on pixel values of the plurality of border pixels, the weighted average being determined in accordance with distances from the plurality of border pixels to the pixel of interest.

6. The image processing device according to claim 5,
wherein the extracting part extracts the border area from a surrounding pixel area including the pixel of interest, and
wherein the prediction part predicts the plurality of pixel values of the pixel of interest based on the pixel values of the plurality of border pixels in the border area in the surrounding pixel area.

7. The image processing device according to claim 6, wherein, when the border area is not included in the surrounding pixel area, the prediction part uses a preconfigured pixel value as a predicted value of the pixel of interest.

8. The image processing device according to claim 1, wherein, after the pixel values in the saturated area in the image data are predicted, a pixel value of each pixel of the image data is compressed such that a maximum value of the predicted pixel values stays within the pixel values in the unsaturated area.

9. The image processing device according to claim 1, wherein the prediction part performs:
a process of calculating a parameter of an approximate expression that is used to predict the pixel value of the pixel of interest, based on a result of extraction by the extracting part using image data that is captured in advance by the imaging device; and
a process of predicting, on a real time basis, the pixel value of the pixel of interest in the image data captured by the imaging device, by using the calculated parameter.

10. An image processing method comprising:
extracting an unsaturated area, in which pixel values are not saturated, and a saturated area, in which pixel values are saturated, from image data that is captured by an imaging device and that shows an image including a plurality of pixels; and
predicting a pixel value of a pixel of interest in the saturated area based on pixel values of a plurality of border pixels in a border area, the border area being located in the unsaturated area and bordering the saturated area,
wherein the image data is captured for each of the plurality of pixels having a plurality of colors,
wherein in the extracting, the unsaturated area and the saturated area from each image data of the plurality of colors are extracted, and
wherein in the predicting, a first prediction process of predicting a pixel value of a color of interest in the saturated area, the color of interest being one of the plurality of colors, based on a ratio of the pixel value of the color of interest in the border area to a pixel value of another color that is not saturated, is performed.

* * * * *